United States Patent [19]

Sakamoto

[11] Patent Number: 4,598,319
[45] Date of Patent: Jul. 1, 1986

[54] TELEVISION SYNCHRONOUS RECEIVER

[75] Inventor: Yoichi Sakamoto, Takatsuki, Japan

[73] Assignee: Matsushita Electric Industrial Co., Ltd., Kadoma, Japan

[21] Appl. No.: 623,114

[22] Filed: Jun. 22, 1984

[30] Foreign Application Priority Data

Jun. 24, 1983 [JP] Japan ............................ 58-114799
Jun. 24, 1983 [JP] Japan ............................ 58-114800

[51] Int. Cl.<sup>4</sup> ............................................. H04N 5/50
[52] U.S. Cl. .............................. 358/195.1; 358/193.1
[58] Field of Search ............... 358/195.1, 193.1, 191.1, 358/188; 455/182, 183

[56] References Cited

U.S. PATENT DOCUMENTS 4,461,035 7/1984 Sakamoto .................... 358/195.1 X

OTHER PUBLICATIONS

Appl. Ser. No. 550,221, Sakamoto, Television Synchronous Receiver, Filed: 11/9/83.

Primary Examiner—James J. Groody
Assistant Examiner—E. Anne Toth
Attorney, Agent, or Firm—Wenderoth, Lind & Ponack

[57] ABSTRACT

A television synchronous receiver is provided which is capable of greatly reducing the mixture of the carrier chrominance signal, vestigial luminance signal, and carrier sound signal in a lower adjacent channel into the baseband video signal in a desired channel being received. The television synchronous receiver is composed of a synchronous detector for effecting synchronous detection of a television signal by using a Costas loop, and a low-pass filter for filtering an output from the synchronous detector. The receiver also has an A/D converter for converting a baseband video signal contained in an output from the low-pass filter into a digital signal, and a vertical filter for filtering an output video signal spectrum from the A/D converter, and a D/A converter for converting an output from the vertical filter into a video signal, so that, irrespective of the fact that a television broadcast wave contains a lower adjacent channel, the converted luminance signal, carrier chrominance signal, and carrier sound signal of the lower adjacent channel produced by the synchronous detector are prevented from being mixed.

18 Claims, 8 Drawing Figures

TELEVISION SYNCHRONOUS RECEIVER

CROSS REFERENCE TO RELATED APPLICATIONS

This application is related to U.S. application Ser. No. 550,221, filed Nov. 9, 1983 and bearing common inventorship to that of the present application.

BACKGROUND OF THE INVENTION

1. Field of the invention

The present invention relates to a television synchronous receiver for use in a television receiver and a VTR video tuner.

2. Description of the Prior Art

So-called electronic tuners having tuning circuits each comprised of a varactor diode and an inductor are widely used in recent years in television receivers and VTR video tuners. The electronic tuners are advantageous in that they have no contacts and hence no contact failures, and are capable of providing many functions such as remote control because of their electronic controllability. However, the electronic tuners fail to have characteristics as originally designed since the varactor diodes have irregular characteristics and require the inductors for tuning, and are difficult to manufacture without adjustment and on an automated basis.

The inventor has already invented a television synchronous receiver employing a Costas loop to replace receivers having a tuning circuit composed of a varactor diode and an inductor.

The prior television synchronous receiver invented by the inventor will hereinafter be described with reference to the drawings. FIG. 1 of the accompanying drawings is a block diagram of the prior art television synchronous receiver. The television synchronous receiver comprises a high-frequency input unit 1, a first synchronous detector 2, a second synchronous detector 3, a first low-pass filter 4, a second low-pass filter 5, a first signal amplifier 6, a second signal amplifier 7, a phase comparator 8, a third low-pass filter 9, a voltage adder 10, a voltage-controlled oscillator 11, a 90° phase shifter 12, a channel selection voltage generator 13, and a video signal filter 14.

Operation of the television synchronous receiver thus constructed will hereinafter be described. A video carrier signal $v_I(t)$ of a desired channel received by the high-frequency input unit 1 is subjected to vestigial-sideband modulation and expressed by:

$$v_I(t) = Re\{[I(t) + jQ(t)]exp j[\omega_i t + \phi_i]\} \quad (1)$$
$$= I(t)cos(\omega_i t + \phi_i) - Q(t)sin(\omega_i t + \phi_i)$$

where Re indicates a real part of the formula within the braces { }, I(t) is an in-phase component of the modulated carrier and contains a video signal, Q(t) is a quadrature component of the modulated carrier, $\omega_i$ is the angular frequency of the video carrier, and $\phi_i$ is the phase of the video carrier. The video carrier signal $v_I(t)$ is applied via the high-frequency input unit 1 to one input terminal of the first synchronous detector 2.

An output from the voltage-controlled oscillator 11 is expressed by:

$$v_o(t) = A_o \cos(\omega_o t + \phi_o) \quad (2)$$

and, when this output is applied to the other input terminal of the first synchronous detector 2 which comprises a voltage multiplier, the first synchronous detector 2 produces an output $v_I(t)$ expressed as follows:

$$v_I(t) = v_I(t)v_o(t) \quad (3)$$
$$= \frac{A_o I(t)}{2}\{\cos[\omega_i + \omega_o]t + \phi_i + \phi_o] +$$
$$\cos[(\omega_i - \omega_o)t + \phi_i - \phi_o]\} -$$
$$\frac{A_o Q(t)}{2}\{\sin[\omega_i + \omega_o]t + \phi_i + \phi_o] +$$
$$\sin[(\omega_i - \omega_o)t + \phi_i - \phi_o]\}$$

When the output from the voltage-controlled oscillator is synchronized with the video carrier, $\omega_o = \omega_i$, and the output $v_I(t)$ is expressed by:

$$v_I(t) = \frac{A_o I(t)}{2}\{\cos(2\omega_i t + \phi_i + \phi_o) + \cos(\phi_i - \phi_o)\} - \quad (4)$$
$$\frac{A_o Q(t)}{2}\{\sin(2\omega_i t + \phi_i + \phi_o) + \sin(\phi_i - \phi_o)\}$$

By removing the $2\omega_i$ signal with the low-pass filter 4, the output $v_I(t)$ becomes:

$$v_I(t) = \frac{A_o I(t)}{2}\cos\phi - \frac{A_o Q(t)}{2}\sin\phi \quad (5)$$

where $\phi$ is $\phi_i - \phi_o$ which is the phase difference between the video carrier and the output from the voltage-controlled oscillator. If $\phi = 0$, then $$v_I(t) = \frac{A_o I(t)}{2} \quad (6)$$

Therefore, the signal component I(t) in phase with the video carrier is obtained as the detected output. However, no quadrature component is detected. The detected output is applied through the low-pass filter 4 and the signal amplifier 6 to the video signal filter 14.

When a television signal is received with a superheterodyne receiver system, the overall baseband frequency characteristics can be regarded as flat due to the characteristics of an intermediate-frequency amplifier having a Nyquist slope. However, when a television signal is received with a synchronous receiver system, the overall baseband frequency has characteristics as shown in FIG. 2(a), in which the voltage gain in the low frequency range is twice that in the high frequency range. With the prior art arrangement as illustrated in FIG. 1, the video signal filter 14 has frequency characteristics as shown in FIG. 2(b) to correct the overall baseband frequency characteristics.

The prior television synchronous receiver described above with respect to its construction and operation utilizes a Costas loop which is one type of the synchronous carrier recovery system. Therefore, even when the received television signal is weak, the output from a local oscillator can be brought into synchronism with the received television signal. The above prior art arrangement however has had a problem in that a carrier chrominance signal in a channel lower than and adjacent to a desired channel to be received, a partial luminance signal, and a carrier sound signal are mixed as a disturbance signal into a baseband video signal.

More specifically, a disturbance signal is mixed which will be described with reference to FIG. 3. A carrier television signal is composed of signals having the frequency relationship as shown in FIG. 3(a), the desired channel being shown on the righthand side and the lower adjacent channel on the lefthand side. A television signal in the desired channel is subjected to synchronous detection in the synchronous detector 2 so that the signal is converted into a baseband video signal, a carrier chrominance signal, and a carrier sound signal as shown in FIG. 3(b). Likewise, a television signal in the lower adjacent channel is converted by the synchronous detector 2 into an adjacent carrier video signal, an adjacent carrier chrominance signal, and an adjacent carrier sound signal as shown in FIG. 3(c). The frequency component as indicated by the hatched area in FIG. 3(c) is removed when the output from the synchronous detector 2 passes through the low-pass filter 4, the removed component contains most of the energy of the adjacent carrier video signal. However, the other components shown in FIG. 3(c), mainly the adjacent carrier chrominance signal and the adjacent carrier sound signal are mixed into the baseband video signal illustrated in FIG. 3(a).

SUMMARY OF THE INVENTION

It is an object of the present invention to provide a television synchronous receiver capable of greatly reducing the mixture of the carrier chrominance signal, vestigial luminance signal, and carrier sound signal in a lower adjacent channel into the baseband video signal in a desired channel being received.

Another object of the present invention is to provide a television synchronous receiver composed of a synchronous detector for effecting synchronous detection of a television signal by using a Costas loop, a low-pass filter for filtering an output from the synchronous detector, an A/D converter for converting a baseband video signal contained in an output from the low-pass filter into a digital signal, a vertical filter for filtering an output video signal spectrum from the A/D converter, and a D/A converter for converting an output from the vertical filter into a video signal, so that, irrespectively of the fact that a television broadcast wave contains a lower adjacent channel, the converted luminance signal, carrier chrominance signal, and carrier sound signal of the lower adjacent channel produced by the synchronous detector are prevented from being mixed.

Still another object of the present invention is to provide a television synchronous receiver composed of a synchronous detector for effecting synchronous detection of a television signal by using a Costas loop, a low-pass filter for filtering an output from the synchronous detector, a signal sampler for sampling a baseband video signal contained in an output from the low-pass filter into an analog discrete signal, a vertical filter for filtering an output video signal spectrum from the signal sampler, and an interpolating filter for interpolating an output from the vertical filter into a continous value to produce a video signal, so that, irrespectively of the fact that a television broadcast wave contains a lower adjacent channel, the converted luminance signal, carrier chrominance signal, and carrier sound signal of the lower adjacent channel produced by the synchronous detector are prevented from being mixed.

Still another object of the present invention is to construct the foregoing vertical filter of an adaptive vertical filter controlled by a vertical filter controller, so that the converted signals in the lower adjacent channel can be separated and removed without deteriorating the quality of signals in a desired channel through the vertical filter.

A still further object of the present invention is to construct the adaptive vertical filter of a transversal filter composed of a first adder for adding an output from a signal input terminal and taps of even-numbered one-horizontal-period delay elements, a second adder for adding outputs from taps of odd-numbered one-horizontal-period delay elements, a third adder for adding outputs from the first and second adders to produce a luminance signal, and a subtractor for subtracting the output of the second adder from the output of the first adder to produce a carrier chrominance signal, so that, irrespectively of the fact that video and carrier chrominance signals have a shared band in a frequency interlace system, as with a television signal, a baseband video signal in a desired channel can be separated and selected from a converted signal in a lower adjacent channel by the adaptive vertical filter.

A still further object of the present invention is to equalizing the weights of the taps of the one-horizontal-period delay elements in the transversal filter, so that the filter is of a simple arrangement though the passband has frequency characteristics which are not equal to ideal filter characteristics.

Still another object of the present invention is to construct the vertical filter controller of a horizontal low-pass filter having a passband of frequencies obtained by subtracting an intermediate sound frequency from an inter-channel frequency, a vertical filter having a sufficiently small passband for removing a carrier chrominance signal spectrum in a lower adjacent channel, a horizontal bandpass filter for passing an output from the vertical filter through a passband having a lower frequency limit obtained by subtracting the intermediate sound frequency from the inter-channel frequency and an upper frequency limit equal to the intermediate sound frequency, means for superimposing an output from the horizontal bandpass filter and an output from the vertical low-pass filter, means for adding an output from the superimposing means and an output from the horizontal low-pass filter, and a level detector for detecting a difference between scanning lines of an output level from the adding means, so that the level difference between scanning lines in a desired channel can be detected without being affected by a converted signal in a lower adjacent channel.

According to the present invention, a television synchronous receiver comprises a voltage-controlled oscillator, a 90° phase shifter for shifting an output from the voltage-controlled oscillator by 90°, first and second synchronous detectors for effecting synchronous detection of in-phase and quadrature components of a video carrier signal by using the outputs from the voltage-controlled oscillator and the 90° phase shifter as respective synchronous carriers, first and second low-pass filters for filtering outputs from the first and second synchronous detectors, a phase detector for detecting a phase difference between the video carrier signal and the output from the voltage-controlled oscillator based on outputs from the first and second low-pass filters, first means for feeding an output from the phase detector back to the voltage-controlled oscillator, second means for converting a baseband video signal contained in the output from the first low-pass filter into a discrete value, a vertical filter for filtering a video signal spectrum in a desired channel in an output from the second means, and third means for converting an output from the vertical filter into a continuous value. With this arrangement, a baseband video signal spectrum and a carrier chrominance signal spectrum in a channel desired to be received can be separated and selected from a carrier chrominance signal spectrum and a vestigial video signal spectrum in a lower adjacent channel, and any mixture of a carrier sound signal in the lower adjacent channel can be reduced.

The above and other objects and features of the invention will be apparent from a reading of the following description in accordance with the accompanying drawings.

DESCRIPTION OF THE PREFERRED EMBODIMENTS

Embodiments of the present invention will hereinafter be described with reference to the drawings.

Figure 4:
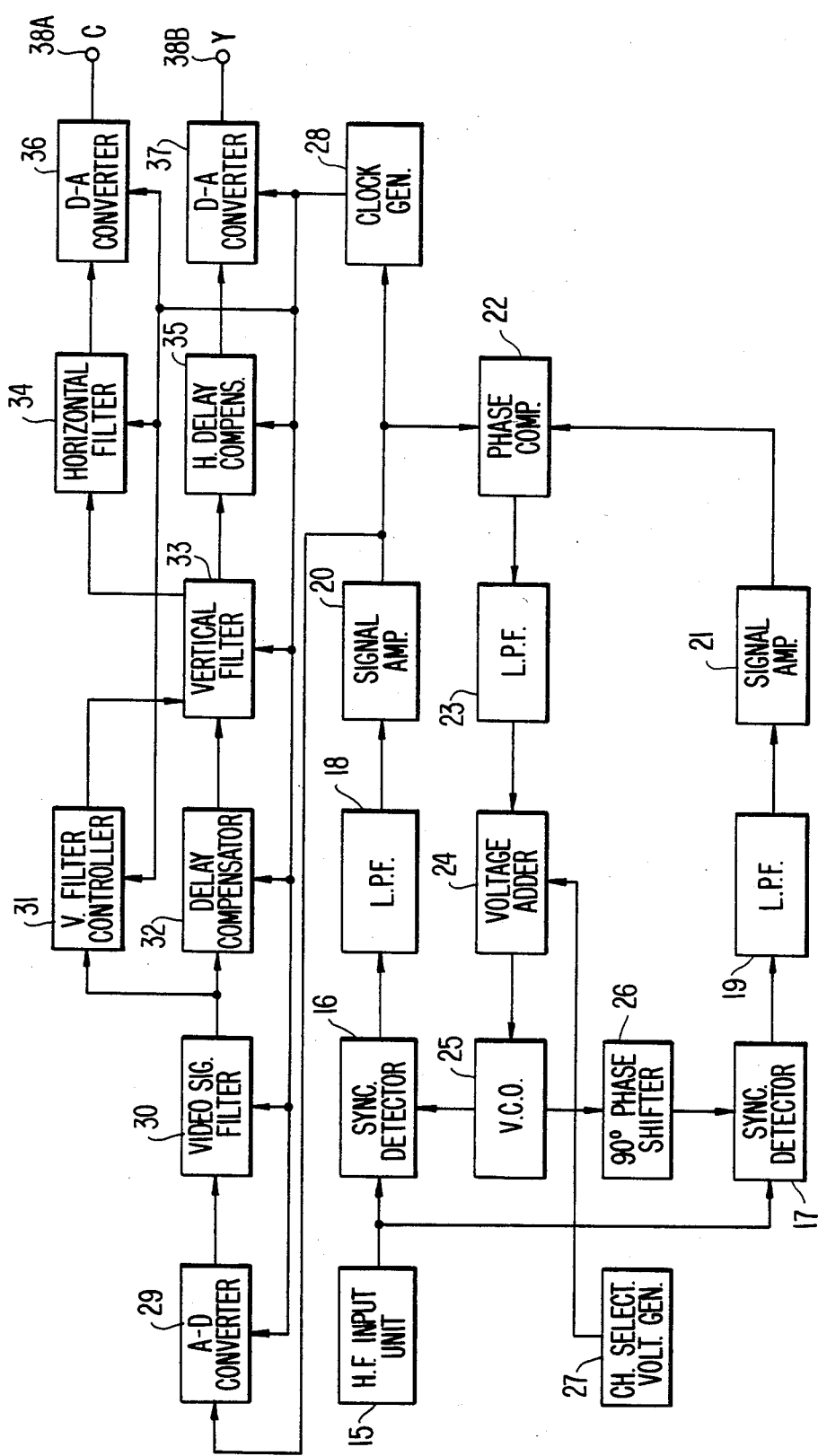
FIG. 4 is a block diagram of a television synchronous receiver according to an embodiment of the present invention.

FIG. 4 shows in block form a television synchronous receiver according to an embodiment of the present invention.

Figure 1:
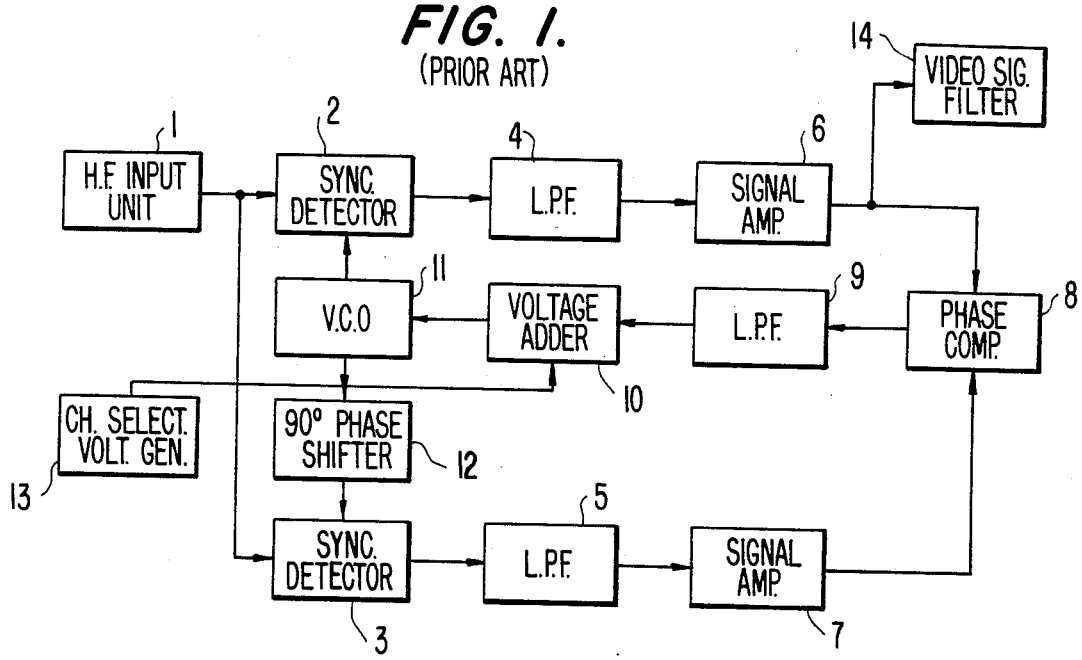
FIG. 1 is a block diagram of a prior television synchronous receiver.

As shown in FIG. 4, the television synchronous receiver comprises a high-frequency input unit 15, a first synchronous detector 16, a second synchronous detector 17, a first low-pass filter 18, a second low-pass filter 19, a first signal amplifier 20, a second signal amplifier 21, a phase comparator 22, a third low-pass filter 23, a voltage adder 24, a voltage-controlled oscillator 25, a 90° phase shifter 26, and a channel selection voltage generator 27, which all correspond to the blocks bearing the same identifications in FIG. 1. Their operation is the same as that described above with reference to the prior art arrangement. The television synchronous receiver also includes a clock generator 28, an A/D converter 29, a video signal filter 30, a vertical filter controller 31, a filter control delay compensator 32, a vertical filter 33, a horizontal filter 34, a horizontal delay compensator 35, a first D/A converter 36, a second D/A converter 37, an output terminal 38A for a carrier chrominance signal C, and an output terminal 38B for a luminance signal Y.

Figure 2A:
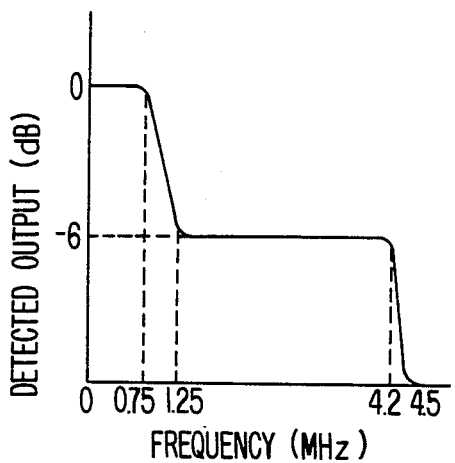
FIG. 2(a) is a diagram showing baseband frequency characteristics of a video signal.
Figure 2B:
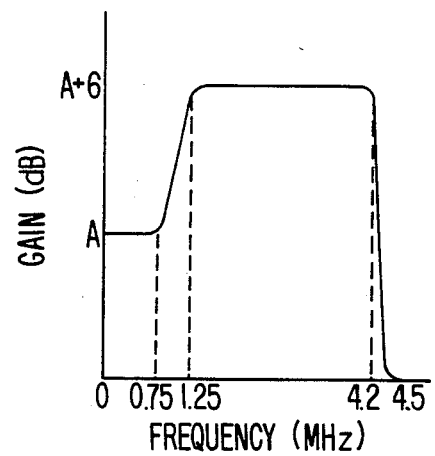
FIG. 2(b) is a diagram showing frequency characteristics of a video signal filter.
Figure 3A:
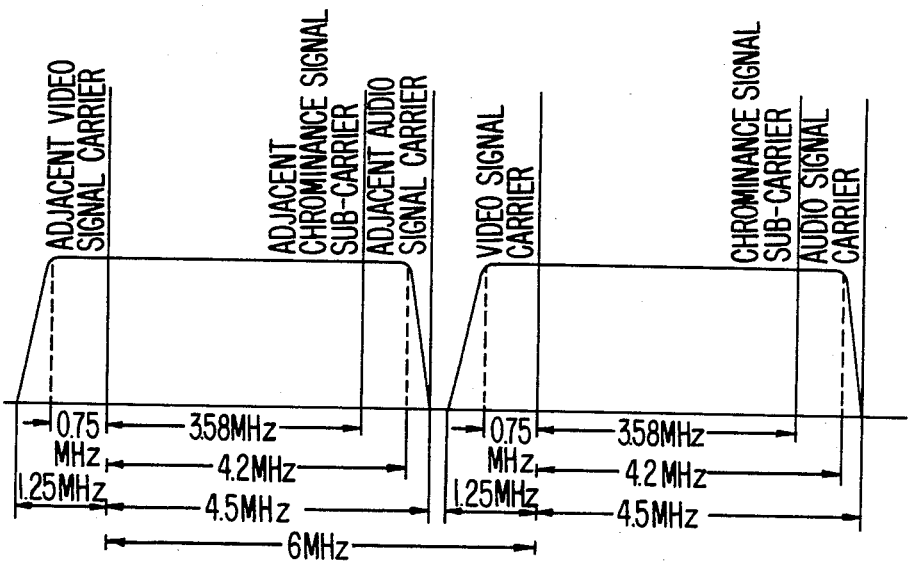
FIG. 3(a) is a diagram showing the frequency relationship between television signals in a desired channel and a lower adjacent channel.
Figure 3B:
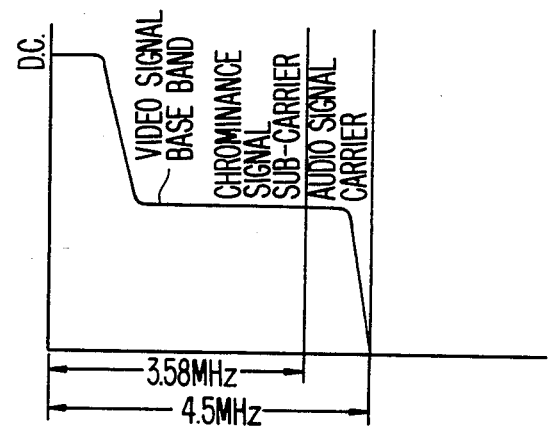
FIG. 3(b) is a diagram showing converted frequencies in the desired channel.
Figure 3C:
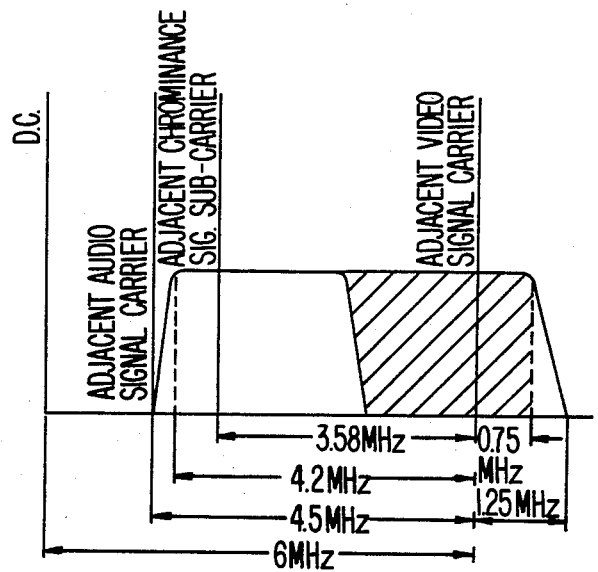
FIG. 3(c) is a diagram showing converted frequencies in the lower adjacent channel.

Operation of the television synchronous receiver thus constructed according to the embodiment of the invention will be described. The television synchronous receiver is arranged to process television signals in a digital fashion. A television synchronizing signal or a color burst signal is separated from an output from the first signal amplifier 20 to control the clock generator 28 to produce a clock output for digital signal processing. The television signal issued from the first signal amplifier 20 is converted by the A/D converter 29 into a digital signal which is applied to a video signal filter 30 comprising a digital filter. The video signal filter 30 has the same frequency characteristics as those shown in FIG. 2(b).

A two-dimensional frequency having a horizontal frequency and a vertical frequency of a television signal will now be considered. Horizontal and vertical unit delay operators are expressed by complex numbers $Z^{-1}$, $W^{-1}$, respectively, as follows:

$$Z^{-1} = e^{-j2\pi\mu\xi_o} \tag{11}$$

$$W^{-1} = e^{-j2\pi\nu\eta_o} \tag{12}$$

where $\xi_o$ and $\eta_o$ are the horizontal and vertical sampling periods, respectively.

A desired frequency response $F_{dv}(\nu)$ of the vertical filter (33) is expressed by:

$$F_{dv}(\nu) = \sum_{n=-\infty}^{\infty} f_{dv}(n) \, e^{-j2\pi\nu\eta_o n} \tag{13}$$

where $f_{dv}(n)$ is the corresponding impulse response given by $$f_{dv}(n) = \frac{1}{\nu_o} \int_{-\frac{\nu_o}{2}}^{\frac{\nu_o}{2}} F_{dv}(\nu) \, e^{j2\pi\nu\eta_o n} \, d\nu \tag{14}$$

where $\nu_o$ is the sampling frequency $=1/\eta_o$.

Figure 5:
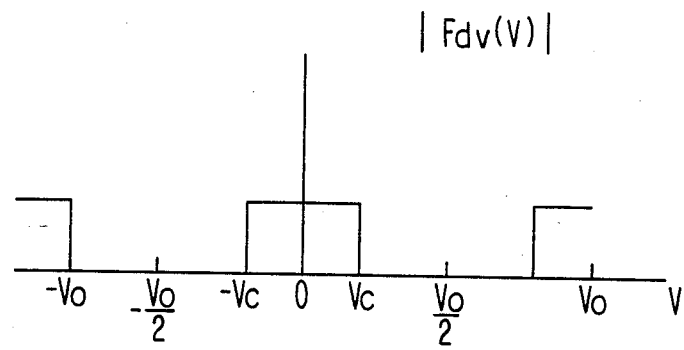
FIG. 5 is a diagram showing a frequency response of an ideal low-pass filter.

It is now assumed that the vertical filter is an ideal low-pass filter with the desired frequency response $F_{d\nu}(\nu)$ as shown in FIG. 5. Thus, in $-\nu_o/2 < \nu < \nu_o/2$, $$F_{d\nu}(\nu) = \begin{cases} 1, & |\nu| \leq \nu_c \\ 0, & \nu_c < |\nu| \leq \nu_o/2 \end{cases} \quad (15)$$

Since $F_{d\nu}(\nu)$ is periodic, the equation (15) determines a frequency response for all $\nu$. An impulse response $f_{d\nu}(n)$ is given from the equations (14) and (15) as follows;

$$f_{d\nu}(n) = \frac{1}{\nu_o} \int_{-\nu_c}^{\nu_c} e^{j2\pi\nu\eta_o n} d\nu \quad (16)$$

$$= \frac{\sin(2\pi\nu_c\eta_o n)}{n\pi}$$

Since $f_{d\nu}(n)$ is a sequence over an infinite interval, n is cut off where appropriate to make the impulse response a causal impulse response over a finite interval. Therefore, an impulse response $f_\nu(n)$ of the vertical filter 33 is determined as follows:

$$f_\nu(n) = \begin{cases} f_{d\nu}(n), & 0 \leq n \leq N-1 \\ 0, & \text{at other } n \end{cases} \quad (17)$$

In general, $f_\nu(n)$ can be expressed as the product of the desired impulse response $f_{d\nu}(n)$ and a window $g(n)$ having a finite width. Thus, $f_\nu(n)$ is a sequence over a finite interval and can be expressed by:

$$f_\nu(n) = f_{d\nu}(n)g(n) \quad (18)$$

For the example of the equation (17), the window is:

$$g(n) = \begin{cases} 1, & 0 \leq n \leq N-1 \\ 0, & \text{at other } n \end{cases} \quad (19)$$

The equation (19) is indicative of a square window. The window $g(n)$ may instead be of another window such as a Hamming window for example.

While the ideal low-pass filter is used in the equation (15) for providing the desired frequency response $F_{d\nu}(\nu)$, a frequency response $F_\nu(\nu)$ may also be used in which the impulse response $f_\nu(n)$ is indicated by the following equation:

$$f_\nu(n) = \begin{cases} 1, & 0 \leq n \leq N-1 \\ 0, & \text{at other } n \end{cases} \quad (20)$$

$$F_\nu(\nu) = \sum_{n=0}^{N-1} e^{-j2\pi\nu\eta_o n} = \frac{1 - e^{-j2\pi\nu\eta_o N}}{1 - e^{-j2\pi\nu\eta_o}} \quad (21)$$

$$= \frac{\sin(\pi\nu\eta_o N)}{\sin(\pi\nu\eta_o)} e^{-j\pi\nu\eta_o(N-1)}$$

The frequency response $F_\nu(\nu)$ obtained with $N=2$ in the equation (21) is given by nothing but a two-horizontal-period (2H), comb-line filter used for separating the luminance signal and chrominance signal of a color television signal (YC separation).

Figure 6:
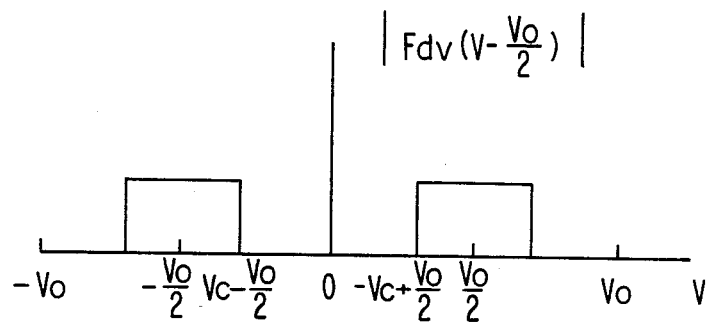
FIG. 6 is a diagram illustrating a frequency response obtained by shifting the frequency, by $v_o/2$, of the frequency response of the ideal low-pass filter.

It is also assumed that $F_{d\nu}(\nu - \nu_o/2)$ is obtained by shifting, as shown in FIG. 6, the frequency response of FIG. 5 by $\nu_o/2$. That is, $$F_{d\nu}(\nu - \nu_o/2) = \begin{cases} 1, & -\nu_o/2 \leq \nu \leq \nu_c - \nu_o/2 \text{ and} \\ & -\nu_c + \nu_o/2 \leq \nu \leq \nu_o/2 \\ 0, & \nu_c - \nu_o/2 < \nu < -\nu_c + \nu_o/2 \end{cases} \quad (22)$$

The impulse response $f_{d\nu}(n)$ at this time is given from the equation (21) as follows:

$$f_{d\nu}(n) = \frac{\sin\{2\pi(\nu_c - \nu_o/2)\eta_o n\}}{n\pi} \quad (23)$$

$$= \frac{\sin(2\pi\nu_c\eta_o n - n\pi)}{n\pi}$$

$$= \begin{cases} \frac{\sin(2\pi\nu_c\eta_o n)}{n}, & n \text{ is zero or an even number} \\ -\frac{\sin(2\pi\nu_c\eta_o n)}{n}, & n \text{ is an odd number} \end{cases}$$

Figure 7:
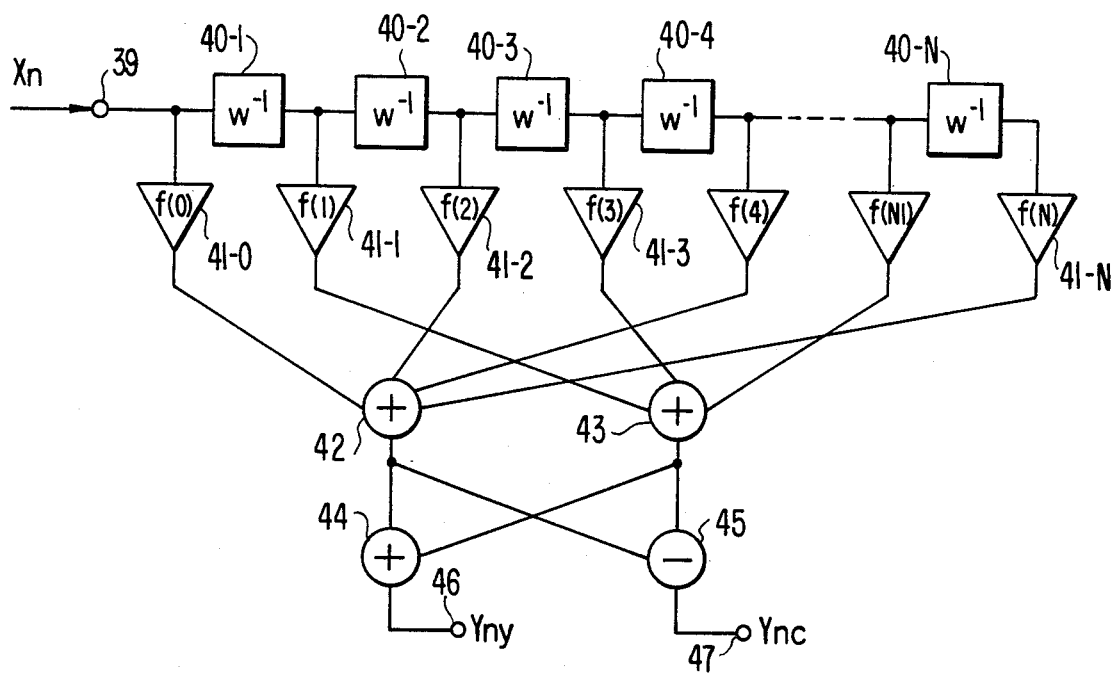
FIG. 7 is a block diagram of a transversal filter.

A transverse filter is constructed as shown in FIG. 7 with the finite sequence $f_\nu(n)$ thus determined being used as a tap gain. To a terminal 39 is applied an output $x_n$ from the video signal filter 30 shown in FIG. 4. The transverse filter includes 1H (one horizontal period) delay elements 40-1, 40-2, . . . 40-N, multipliers 41-0, 41-1, . . . 41-N having the gain $f_\nu(n)$, adders 42, 43, and 44, and a subtractor 45. The multipliers 41-0, 41-1, . . . 41-N are connected to the terminal 39 and output terminals of 1H delay elements 40-1, 40-2, . . . 40-N respectively. The adder 42 adds outputs from the multipliers 41-0, 41-2, 41-4, . . . 41-N, and the adder 43 adds outputs from the multipliers 41-1, 41-3, 41-(N−1). The adder 44 adds outputs from the adders 42, 43, and the subtractor 45 subtracts outputs from the adders 42, 43 one from the other. An output terminal 46 issues a luminance signal $y_{nY}$ in a desired channel to the horizontal delay compensator 45 and an output terminal 47 issues a carrier chrominance signal $y_{nC}$ in the desired channel to the horizontal filter 34.

Figure 8A:
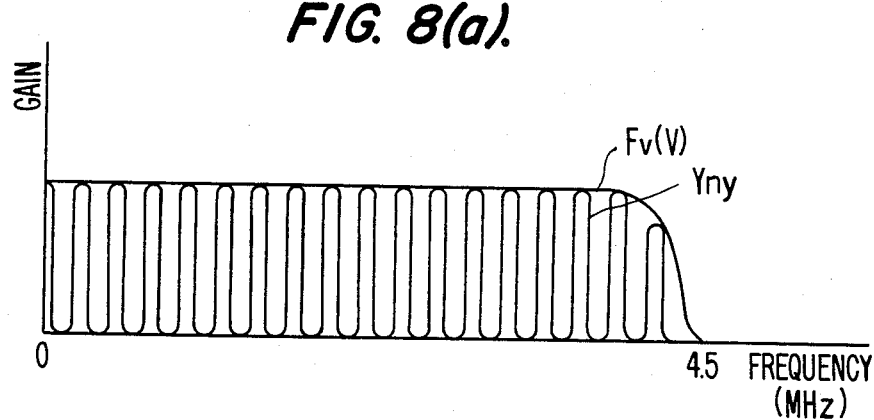
FIG. 8(a) is a diagram showing a frequency response of a vertical filter.
Figure 8B:
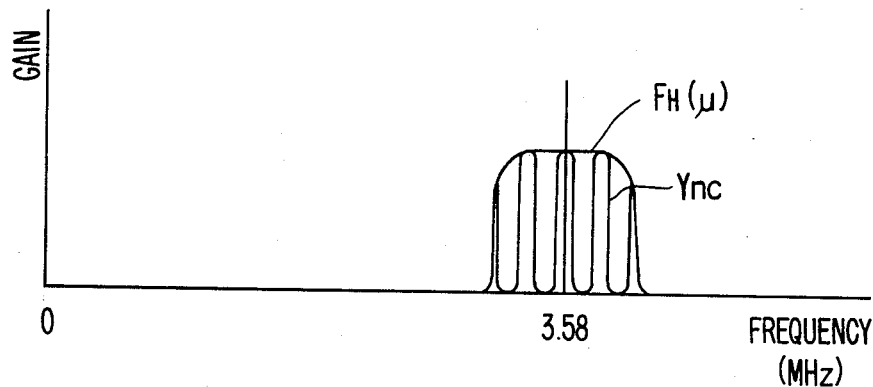
FIG. 8(b) is a diagram showing a frequency response of a horizontal filter.

A frequency response of the horizontal filter 34 has a passband of ±0.5 MHz across a chrominance subcarrier frequency 3.58 MHz in the desired channel as shown in FIG. 8(b). The carrier chrominance signal $y_{nc}$ from the vertical filter 33 is limited in band by the horizontal filter 34. The luminance signal $y_{nY}$ (FIG. 8(a)) issued from the vertical filter 33 is compensated by the horizontal delay compensator 35 for a delay caused by the horizontal filter 34. The carrier chrominance signal $y_{nC}$ is converted into an analog signal by the first D/A converter 36, while the luminance signal $y_{nY}$ is converted into an analog signal by the second D/A converter 37. These analog signals are issued as analog signals C, Y, respectively, through the output terminals 38A, 38B.

Figure 9:
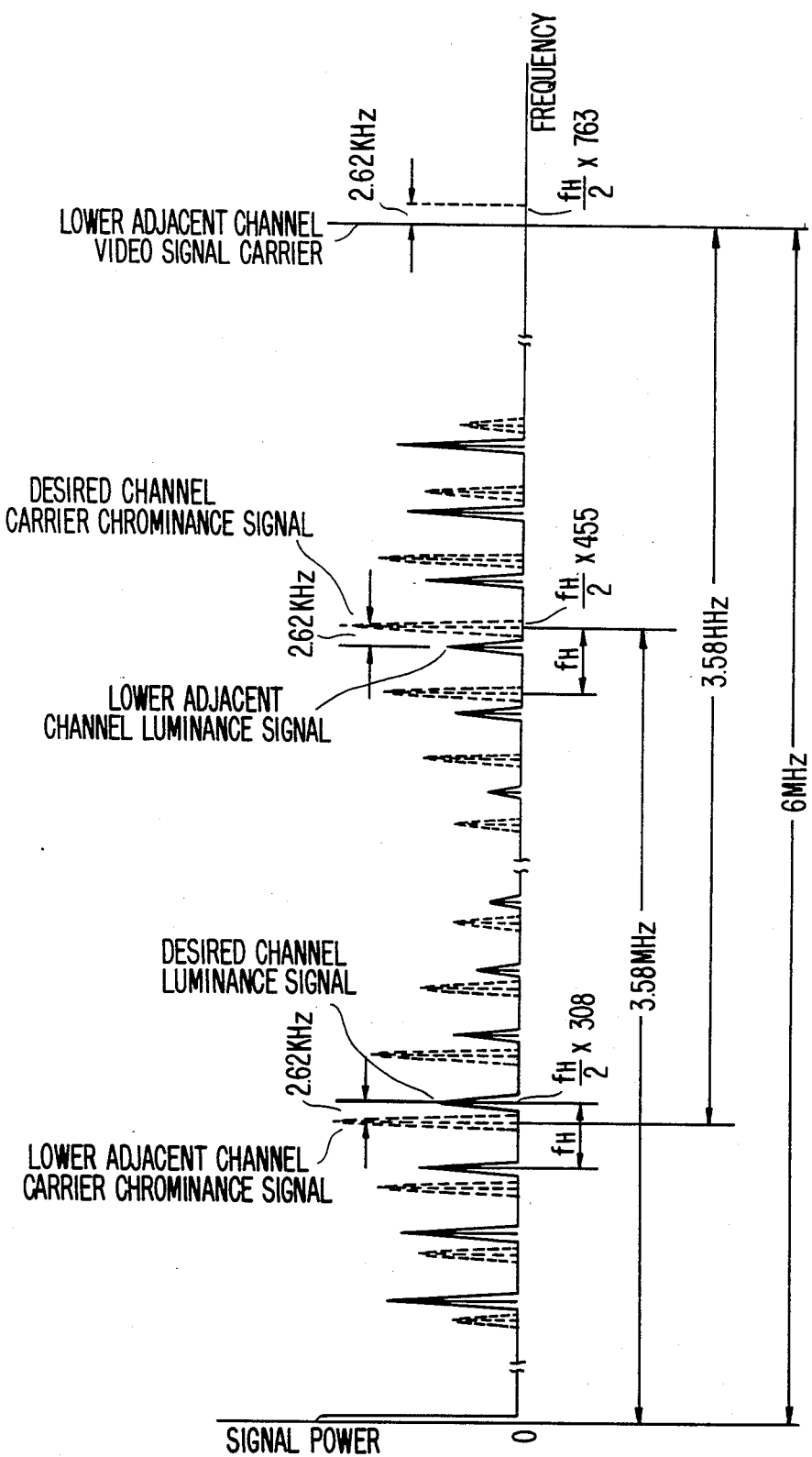
FIG. 9 is a diagram illustrative of the frequency relationship between spectra of the carrier chrominance signal and vestigial luminance signal in a lower adjacent channel and spectra of the luminance signal and carrier chrominance signal in a desired channel.

FIG. 9 shows the frequency relationship between spectral of the carrier chrominance signal and vestigial luminance signal in a lower adjacent channel and spectral of the luminance signal and carrier chrominance signal in a channel desired to be received. The video signal carrier in the lower adjacent channel has a frequency of 6 MHz (according to NTSC system, on which the following description is based). The frequency which is a multiple by an integer of the frequency that is ½ of the horizontal scanning frequency $f_H$ (4.5 MHz/286) in the desired channel and which is of a value closest to 6 MHz is $$(f_H/2) \times 763 = 6.00262 \text{ (MHz)}$$

This is the frequency of the spectrum of the carrier chrominance signal in the desired channel, which is closest to the frequency of the video signal carrier in the lower adjacent channel. The difference between these frequencies is 2.62 KHz. Therefore, the frequency difference between the luminance signal spectrum in the lower adjacent channel and the carrier chrominance signal spectrum in the desired channel is 2.62 KHz. The carrier chrominance signal spectrum and luminance signal spectrum in the lower adjacent channel have a frequency difference of $f_H/2$, and likewise the luminance signal spectrum and carrier chrominance signal spectrum in the desired channel also have a frequency difference of $f_H/2$. Accordingly, the carrier chrominance signal spectrum in the lower adjacent channel and the luminance signal spectrum in the desired channel have a frequency difference of 2.62 KHz.

FIG. 9 also indicates that the spectrum of each signal has a certain frequency width at each peak. In reality, the spectral at frame frequency intervals have peaks at the intervals of $f_H$. If the level of the vertical signal varies rapidly, then the frequency width will be increased, and if the level varies gradually, then the frequency width is reduced. Therefore, the passband width $\nu_c$ of the vertical filter 32 is rendered variable so that the passband width $\nu_c$ is narrowed when the level between scanning lines of a received television signal varies gradually, and the passband width $\nu_c$ is widened when the level changes rapidly. With this arrangement, most of the carrier chrominance signal spectrum and the vestigial video signal spectrum in the lower adjacent channel can be removed while preventing deterioration of the television signal in the desired channel. At the same time, most of the carrier sound signal in the lower adjacent channel is removed since the carrier sound signal is frequency-modulated and has its spectrum spreading in a certain band.

To make the passband width $\nu_c$ of the vertical filter 33 variable, the vertical filter 33 is composed of an adaptive vertical filter which is realized by rendering variable the impulse response $f_\nu(n)$ of the vertical filter 33, as previously described. The vertical filter controller 31 serves to control the vertical filter 33 by giving the value of $f_\nu(n)$ to the same.

Figure 10:
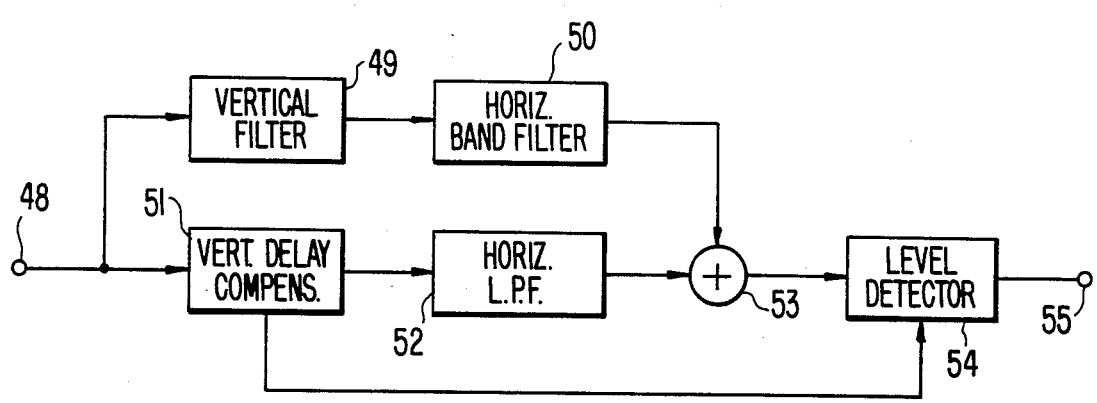
FIG. 10 is a block diagram of a filter assembly used in a vertical filter controller.
Figure 11A:
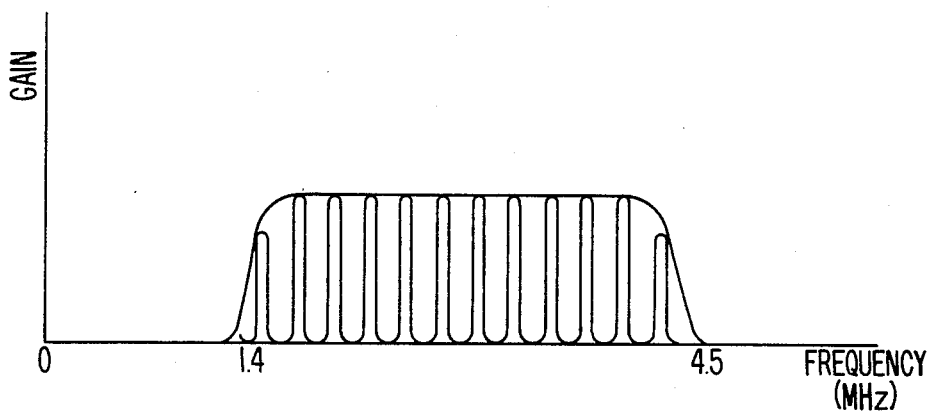
FIG. 11(a) is a diagram showing a frequency response of the filter in the vertical filter controller, in which a vertical filter and a horizontal filter are connected in cascade.
Figure 11B:
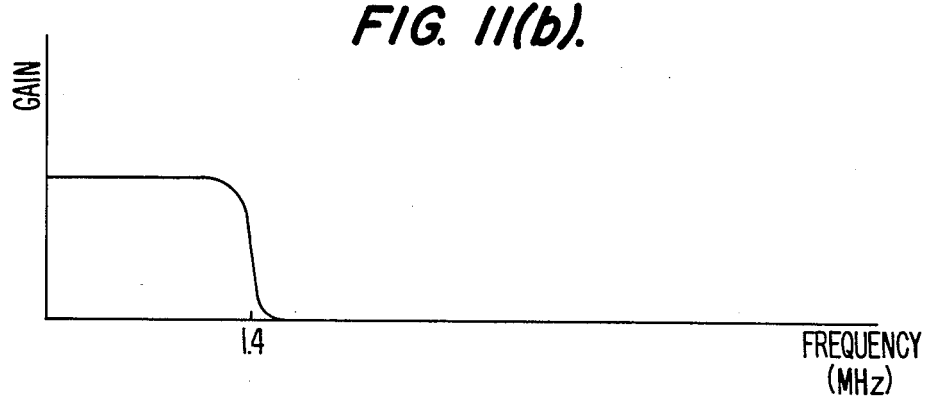
FIG. 11(b) is a diagram illustrating a frequency response of a horizontal low-pass filter in the filter assembly in the vertical filter controller.
Figure 11C:
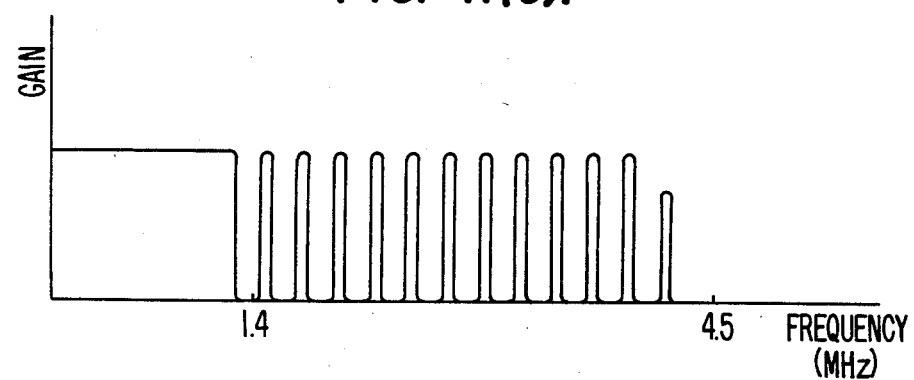
FIG. 11(c) is a diagram showing a frequency response of a filter assembly in a horizontal filter controller.

FIG. 10 shows a filter assembly in the vertical filter controller 31, and FIG. 11 is illustrative of a frequency response of the filter assembly. The filter assembly serves to separate and select a signal spectrum only in a desired channel. To a terminal 48 is applied an output from the video signal filter 30 shown in FIG. 4. A vertical filter 49 has a passband width narrower than the frequency difference 2.62 KHz. An output from the vertical filter 49 is applied to a horizontal band filter 50 having a passband in the range of from 1.4 MHz to 4.5 MHz. The lower limit 1.4 MHz is of a value obtained by subtracting 0.1 MHz which is ½ of the band width of a side band due to frequency modulation of a sound carrier from the frequency 1.5 MHz converted by the synchronous detector 16 from the sound carrier in the lower adjacent channel. A frequency response obtained by connecting the vertical filter 49 and the horizontal filter 50 in cascade is illustrated in FIG. 11(a). The signal applied to the terminal 48 is also applied through a vertical delay compensator 51 to a horizontal low-pass filter 52 which has a frequency response as illustrated in FIG. 11(b). An output from the horizontal filter 50 and an output from the horizontal low-pass filter 52 are added by an adder 53, and the sum is applied through a terminal level detector 54 to a terminal 55. The filter arrangement shown in FIG. 10 has a frequency response as shown in FIG. 11(c). 1H delay elements $W^{-1}$ required by the vertical filter 49 and the vertical delay compensator 51 may be shared with the delay elements 40-1, 40-2, ... 40-N illustrated in FIG. 7.

From the spectrum thus obtained of the signal in the desired channel, the level difference between scanning lines of an image is detected by the level detector 54 in the vertical filter controller 31. An output from the level detector 54 is used as the output from the vertical filter controller 31 for determining the tap gain $f_\nu(n)$ of the vertical filter 33.

With the foregoing embodiment, therefore, the disturbance due to the signal in the lower adjacent channel is removed by using the vertical filter 33 to filter the signal in the desired channel which is produced by synchronous detection of the television signal. By employing an adaptive filter for the vertical filter 33, the signal in the desired channel is prevented from suffering from deterioration which would otherwise be caused by the vertical filter 33.

Figure 12:
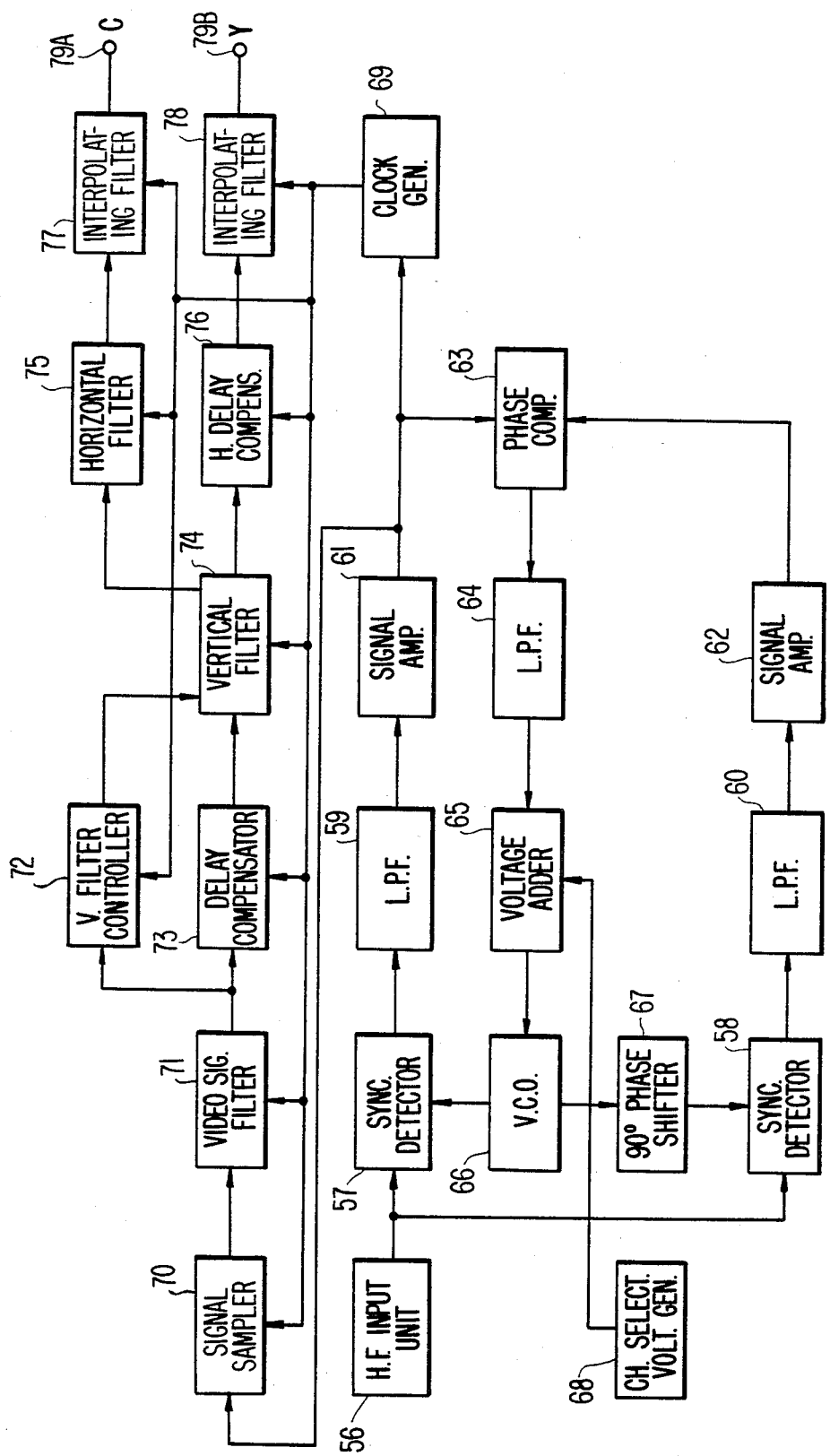
FIG. 12 is a block diagram of a television synchronous receiver according to another embodiment of the present invention.

FIG. 12 shows in block form a television synchronous receiver according to another embodiment of the present invention.

As shown in FIG. 12, the television synchronous receiver comprises a high-frequency input unit 56, a first synchronous detector 57, a second synchronous detector 58, a first low-pass filter 59, a second low-pass filter 60, a first signal amplifier 61, a second signal amplifier 62, a phase comparator 63, a third low-pass filter 64, a voltage adder 65, a voltage-controlled oscillator 66, a 90° phase shifter 67, and a channel selection voltage generator 68, which all correspond to the blocks bearing the same identifications in FIG. 1. Their operation is the same as that described above with reference to the prior art arrangement. The television synchronous receiver also includes a clock generator 69, a signal sampler 70, a video signal filter 71, a vertical filter controller 72, a filter control delay compensator 73, a vertical filter 74, a horizontal filter 75, a horizontal delay compensator 76, a first interpolating filter 77, a second interpolating filter 78, an output terminal 79A for issuing a carrier chrominance signal C, and an output terminal 79B for issuing a luminance signal Y. The vertical and horizontal filters 74, 75 may comprise a charge-transfer device such as a charge-coupled device.

Operation of the television synchronous receiver of FIG. 12 is substantially the same as that of the television synchronous receiver of FIG. 4 except that a television signal is subjected to sampled-analog-signal processing. More specifically, a television signal issued from the first signal amplifier 61 is converted by the signal sampler 70 into a sampled analog signal which is applied to the video signal filter 71 composed of a sampling analog filter. An output (carrier chrominance signal $y_{nC}$ from the horizontal filter 75 is interpolated into a continuous value by the first interpolating filter 77, and an output (luminance signal $y_{nY}$) from the horizontal delay compensator 76 is interpolated into a continuous value by the second interpolating filter 78.

What is claimed is:

1. A television synchronous receiver comprising a voltage-controlled oscillator;
a 90° phase shifter for shifting an output signal from the voltage-controlled oscillator by 90°;
first and second synchronous detectors for effecting synchronous detection of in-phase and quadrature components of a video carrier signal by using output signals from the voltage-controlled oscillator and the 90° phase shifter as respective synchronous carriers;
first and second low-pass filters for filtering output signals from said first and second synchronous detectors respectively;
a phase detector for detecting a phase difference between the video carrier signal and the output signals from said voltage-controlled oscillator based on output signals from said first and second low-pass filters;
first means for feeding an output signal from said phase detector back to said voltage-controlled oscillator;
second means for converting a baseband video signal contained in the output signal from said first low-pass filter into a discrete value;
a vertical filter for filtering a video signal spectrum in a desired channel in an output signal from said second means; and
third means for converting an output signal from said vertical filter into a continuous value.

2. A television synchronous receiver according to claim 1, wherein said vertical filter comprises an adaptive vertical filter having a passband width controlled by an output signal from a vertical filter controller.

3. A television synchronous receiver according to claim 2, wherein said adaptive vertical filter comprises a transversal filter composed of a first adder for adding an output signal from a signal input terminal and taps of even-numbered one-horizontal-period delay elements, a second adder for adding output signals from taps of odd-numbered one-horizontal-period delay elements, a third adder for adding output signals from said first and second adders to produce a luminance signal, and a subtractor for subtracting the output of said second adder from the output signal of said first adder to produce a carrier chrominance signal.

4. A television synchronous receiver according to claim 3, wherein said taps of the one-horizontal-period delay elements in said transversal filter have equal weights.

5. A television synchronous receiver according to claim 2, wherein said vertical filter controller comprises a horizontal low-pass filter having a passband of frequencies obtained by subtracting an intermediate sound frequency from an inter-channel frequency, a vertical filter having a small passband which is selected such that said filter removes a carrier chrominance signal spectrum in a lower adjacent channel, a horizontal bandpass filter for passing an output signal from said vertical filter through a passband having a lower frequency limit obtained by subtracting the intermediate sound frequency from the inter-channel frequency and an upper frequency limit equal to the intermediate sound frequency, means for adding an output signal from said horizontal bandpass filter and an output signal from said horizontal low-pass filter, and a level detector for detecting a difference between scanning lines of an output level from said adding means.

6. A television synchronous receiver according to claim 2, wherein said third means includes a horizontal filter for filtering a chrominance signal component of said video signal spectrum in said desired channel.

7. A television synchronous receiver comprising:
a voltage-controlled oscillator;
a 90° phase shifter for shifting an output signal from the voltage-controlled oscillator by 90°;
first and second synchronous detectors for effecting synchronous detection of in-phase and quadrature components of a video carrier signal by using output signals from the voltage-controlled oscillator and the 90° phase shifter as respective synchronous carriers;
first and second low-pass filters for filtering output signals from said first and second synchronous detectors respectively;
a phase detector for detecting a phase difference between the video carrier signal and the output signals from said voltage-controlled oscillator based on output signals from said first and second low-pass filters;
means for feeding an output signal from said phase detector back to said voltage-controlled oscillator;
analog-to-digital conversion means for converting a baseband video signal contained in the output signal from said first low-pass filter into a discrete value;
a vertical filter for filtering a video signal spectrum in a desired channel in an output signal from said analog-to-digital conversion means; and
digital-to-analog conversion means for converting an output signal from said vertical filter into a continuous value.

8. A television synchronous receiver according to claim 7, wherein said vertical filter comprises an adaptive vertical filter having a passband width controlled by an output signal from a vertical filter controller.

9. A television synchronous receiver according to claim 8, wherein said adaptive vertical filter comprises a transversal filter composed of a first adder for adding an output signal from a signal input terminal and taps of even-numbered one-horizontal-period delay elements, a second adder for adding output signals from taps of odd-numbered one-horizontal-period delay elements, a third adder for adding output signals from said first and second adders to produce a luminance signal, and a subtractor for subtracting the output of said second adder from the output signal of said first adder to produce a carrier chrominance signal.

10. A television synchronous receiver according to claim 9, wherein said taps of the one-horizontal-period delay elements in said transversal filter have equal weights.

11. A television synchronous receiver according to claim 8, wherein said vertical filter controller comprises a horizontal low-pass filter having a passband of frequencies obtained by subtracting an intermediate sound frequency from an inter-channel frequency, a vertical filter having a small passband which is selected such that said filter removes a carrier chrominance signal spectrum in a lower adjacent channel, a horizontal bandpass filter for passing an output signal from said vertical filter through a passband having a lower frequency limit obtained by substracting the intermediate sound frequency from the inter-channel frequency and an upper frequency limit equal to the intermediate sound frequency, means for adding an output signal from said horizontal bandpass filter and an output signal from said horizontal low-pass filter, and a level detector for dectecting a difference between scanning lines of an output level from said adding means.

12. A television synchronous receiver according to claim 8, wherein said digital-to-analog conversion means comprises a first digital-to-analog converter for converting a luminance signal component in said output from said vertical filter into and analog luminance signal, a horizontal filter for filtering a chrominance signal component in said output from said vertical filter, and a second digital-to-analog converter for converting an output signal from said horizontal filter into an analog chrominance signal.

13. A television synchronous receiver comprising a voltage-controlled oscillator;
   a 90° phase shifter for shifting an output signal from the voltage-controlled oscillator by 90°;
   first and second synchronous detectors for effecting synchronous detection of in-phase and quadrature components of a video carrier signal by using output signals from the voltage-controlled oscillator and the 90° phase shifter as respective synchronous carriers;
   first and second low-pass filters for filtering output signals from said first and second synchronous detectors respectively;
   a phase detector for detecting a phase difference between the video carrier signal and the output signals from said voltage-controlled oscillator based on output signals from said first and second low-pass filters;
   means for feeding an output signal from said phase detector back to said voltage-controlled oscillator;
   signal sampling means for sampling a baseband video signal contained in the output signal from said first low-pass filter as a discrete value;
   a vertical filter for filtering a video signal spectrum in a desired channel in an output signal from signal sampling means; and
   interpolating filter means for converting an output signal from said vertical filter into a continuous value.

14. A television synchronous receiver according to claim 13, wherein said vertical filter comprises an adaptive vertical filter having a passband width controlled by an output signal from a vertical filter controller.

15. A television synchronous receiver according to claim 14, wherein said adaptive vertical filter comprises a transversal filter composed of a first adder for adding an output signal from a signal input terminal and taps of even-numbered one-horizontal-period delay elements, a second adder for adding output signals from taps of odd-numbered one-horizontal-period delay elements, a third adder for adding output signals from said first and second adders to produce a luminance signal, and a subtractor for subtracting the output of said second adder from the output signal of said first adder to produce a carrier chrominance signal.

16. A television synchronous receiver according to claim 15, wherein said taps of the one-horizontal-period delay elements in said transversal filter have equal weights.

17. A television synchronous receiver according to claim 14, wherein said vertical filter controller comprises a horizontal low-pass filter having a passband of frequencies obtained by subtracting an intermediate sound frequency from an inter-channel frequency, a vertical filter having a small passband which is selected such that said filter removes a carrier chrominance signal spectrum in a lower adjacent channel, a horizontal bandpass filter for passing an output signal from said vertical filter through a passband having a lower frequency limit obtained by subtracting the intermediate sound frequency from the inter-channel frequency and an upper frequency limit equal to the intermediate sound frequency, means for adding an output signal from said horizontal bandpass filter and an output signal from said horizontal low-pass filter, and a level detector for detecting a difference between scanning lines of an output level from said adding means.

18. A television synchronous receiver according to claim 14, wherein said interpolating filter means comprises a first interpolating filter for obtaining an analog luminance signal from said output signal from said vertical filter, a horizontal filter for filtering a chrominance signal component in said output signal from said vertical filter, and a second interpolating filter for obtaining an analog chrominance signal from an output signal from said horizontal filter.

* * * * *